Jan. 7, 1958  E. F. CARLSEN  2,818,635
TOOL FOR HUB CAPS
Filed Aug. 27, 1954

Inventor
Einar F. Carlsen
Carlson, Pitzner, Hubbard & Wolfe
Atty's

United States Patent Office 2,818,635
Patented Jan. 7, 1958

2,818,635

TOOL FOR HUB CAPS

Einar F. Carlsen, Chicago, Ill.

Application August 27, 1954, Serial No. 452,621

1 Claim. (Cl. 29—245)

The present invention relates generally to a tool and more particularly to a lever tool for removing automobile wheel hub caps.

In order to change an automobile tire, an operator must first remove the clip-mounted wheel hub cap in order to gain access to the nuts holding the wheel to the wheel hub. The tools normally employed to do this are a screw driver and a hammer. An operator places the end of the screw driver into the breach between the outer periphery of the hub cap and the adjacent shoulder of the wheel and drives the screw driver into the breach by pounding it with a hammer or the like.

The use of these tools for removing hub caps, although common practice, is entirely unsatisfactory. In the course of being driven into the annular hub cap breach, the screw driver often mars the hub cap or the wheel by scratching the metal or by scraping away paint or chromium plating. It is also usually difficult for an operator to obtain enough leverage to dislodge the hub cap with the result that the operator often must exert a great amount of physical effort in removing a hub cap in this way. Another disadvantage of using a screw driver or the like as a tool for removing automobile hub caps lies in the fact that the close proximity of the tire and rim to the hub cap affords very little space in which to swing the screw driver in lever fashion. A further disadvantage in using a screw driver as a tool rests in the fact that there is no secure contact between the tool and the hub cap, and the tool can easily slip from an operator's hands with resulting injury to the operator.

Accordingly, it is a general object of the present invention to provide a tool for removing a hub cap which enables an operator to remove such hub cap quickly and with a minimum of effort and inconvenience. It is a collateral object of the invention to provide a tool for removing a hub cap which embodies a lever and fulcrum point within a one-piece tool so that removal of the hub cap is easily effected upon the application of leverage by an operator, and which may be effectual even when used by women or children.

It is a further object of the present invention to provide a device for removing a hub cap which device will securely seat and extend into the breach between the outer periphery of the hub cap and the adjacent shoulder of the wheel so as to prevent slippage of the tool and consequent injury to an operator.

It is another object of the present invention to provide a tool for removing an automobile hub cap which tool is of a shape and size so that it may be operated as a lever in the clear without interference by any of the surrounding stationary portions of the wheel, such as the tire or rim.

Finally, it is an object of the present invention to provide a device for removing a wheel hub cap which does not, when inserted into the breach surrounding the outer periphery of the hub cap, scratch, dent or in any way damage chromium plating or a paint coating on the hub cap or wheel.

Other objects and advantages will become apparent upon reading the attached detailed description and upon reference to the drawings in which.

Figure 4:
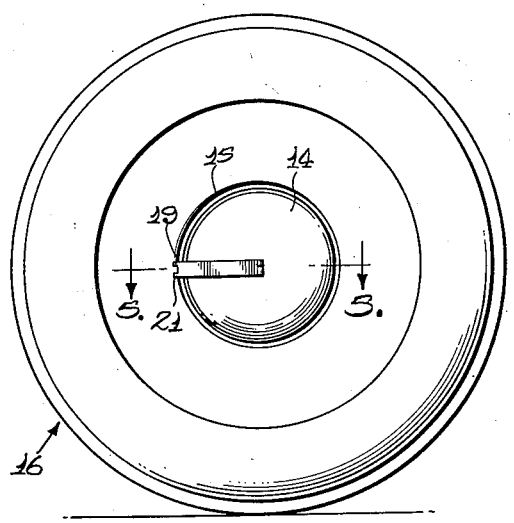
Fig. 4 shows the tool as applied to a hub cap mounted on a wheel.
Figure 2:
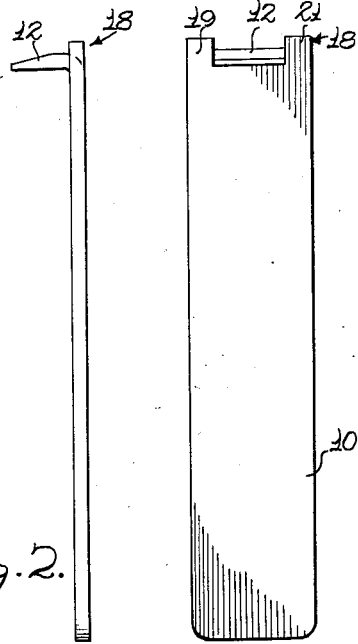
Fig. 2 is an elevation of the illustrative tool.
Figure 1:
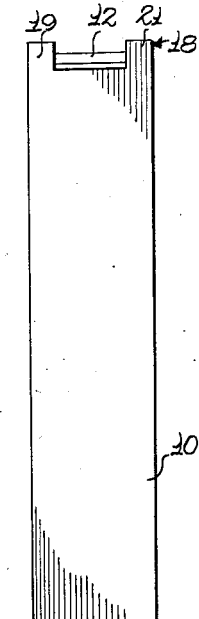
Fig. 1 is a plan view of the device employed in practicing the present invention.
Figure 5:
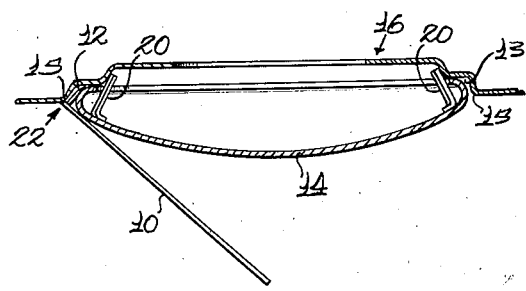
Fig. 5 is a lateral section taken along the line 5—5 in Fig. 4.
Figure 3:
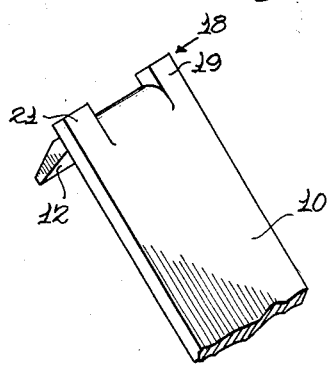
Fig. 3 is a fragmentary perspective of the operative end of the tool.

While the invention has been described in connection with a preferred embodiment, it will be understood that I do not intend to limit the invention thereto, but intend to cover all modifications and alternative constructions falling within the spirit and scope of the appended claim.

Turning now to the drawings, the device includes a rectangular shaped lever 10 formed from a flat bar. In the preferred embodiment of the present invention, a flat bar of spring steel about ⅛ inch thick, 1 inch wide, and about 7 inches long is used.

A spade shaped tooth projection 12 is provided at the first end of the lever 10 in transverse relationship thereto and at a substantially 90° angle to the lever. In the exemplary device, the tooth projection 12 is about ⅜ inch wide and about ⅝ inch long from base to tip. For the purpose of facilitating insertion of the tool into a breach 13 formed between a hub cap 14 and an adjacent shoulder 15 of a wheel 16, the extreme end portion of the tooth projection 12 is beveled for a distance of about ⅜ inch from the end of the projection. In order to provide a leverage fulcrum point 18 for the beveled tooth projection 12, the end of the lever 10 adjacent to the tooth projection extends for a distance of about ⅛ inch beyond the outermost surface of the tooth projection so as to present a point of contact or a fulcrum 22 between the device and the shoulder 15 of the wheel 16. The fulcrum point 18 comprises two spaced ears 19 and 21 which form a bifurcated extension at the end of the lever 10 adjacent to the tooth projection 12. A manual gripping portion is provided at the other end of the lever 10.

Thus, the device easily lends itself to assembly line production as a one-piece tool. For example, a flat piece of bar stock may be subjected at one end to a cutting operation in which the piece is slit to define a central portion and the two ears 19 and 21. The central portion is then bent, preferably by the action of a die, to form the tooth projection 12 in a position transverse to the lever 10. The ears 19 and 21 may be then trimmed to the length shown. The spade shape is imparted to the tooth projection 12 by finally grinding the outside surface of the end of the tooth.

As shown in the drawings, the hub cap 14 is ordinarily mounted on the wheel 16 and held thereupon by means of retaining clips 20. In using the present device an operator places the spade shaped tooth projection 12 into the annular breach 13 between the outer periphery of the hub cap 14 and the adjacent shoulder 15 of the wheel 16 with the gripping portion of the lever 10 extending radially inward. When the tooth projection 12 has been fully inserted into the breach 13, the fulcrum point 18 of the tool assumes a direct contacting relationship with the wheel shoulder 15 and the two surfaces together form a leverage fulcrum 22. Upon moving the gripping portion of the lever 10 in an arc directed away from the hub cap 14, the entire lever swings about the leverage fulcrum 22 thus imparting a prying action to the inserted tooth projection 12 so that the tooth projection forcibly releases the edge of the hub cap 14 from its retaining clips 20 and thus effects a removal of the hub cap from the wheel 16.

It is found in practice that the tool is stable during the prying operation and there is no tendency for the tool to slip sideways or twist in the hand of the operator. This is due to the fact that two ears 19 and 21 serving as a fulcrum point 18 are provided widely spaced from one another and arranged symmetrically on each side of the tooth 12. It is also found in practice that use of the tool permits application of very efficient leverage forces. This is because the two ears 19 and 21, which serve as the fulcrum point 18 and extend outward on the lever 10 beyond the tooth projection 12 so as to be in a position for contacting the wheel shoulder 15, are sufficiently short that the leverage force exerted by the prying tooth 12 is directed substantially perpendicularly against the hub cap 14 and away from the retaining clips 20.

I claim as my invention:

In a tool for removing a hub cap fastened to an automobile wheel by internal spring clips or the like and positioned on the wheel within a wheel shoulder so that an annular breach between the outer periphery of the hub cap and the wheel shoulder is provided, the combination comprising a lever having a spade shaped tooth projection at its first end and projecting at a substantially 90° angle thereto and said spade shaped tooth projection extending transversely of the lever for insertion substantially its entire length in the annular breach, said lever having a manual gripping portion at the other end, said projection comprising a tang-like tooth bent from the central portion of said first lever end and defining on either side thereof a pair of spaced ears, said ears extending the lever axially beyond said projection a distance not greater than the length of said tooth shaped projection and forming a fulcrum point at their transverse end surfaces so that movement of said lever radially outward with respect to said hub cap and around a fulcrum formed by the fulcrum point of the tool and the wheel shoulder will effect a removal of the hub cap from the wheel.

References Cited in the file of this patent

UNITED STATES PATENTS

| | | |
|---|---|---|
| 1,923,770 | Baker | Aug. 22, 1933 |
| 1,975,773 | Davis | Oct. 9, 1934 |
| 2,118,159 | Castner | May 24, 1938 |
| 2,148,213 | Lyon | Feb. 21, 1939 |
| 2,276,105 | Shiells | Mar. 10, 1942 |
| 2,748,457 | Lyon | June 5, 1956 |

FOREIGN PATENTS

| | | |
|---|---|---|
| 455,940 | Germany | Feb. 2, 1927 |